US007168678B2

(12) United States Patent
Schaupp et al.

(10) Patent No.: US 7,168,678 B2

(45) Date of Patent: Jan. 30, 2007

(54) NEEDLE VALVE CONSTRUCTION

(75) Inventors: John F. Schaupp, Toledo, OH (US); Austin A. Saylor, Sylvania, OH (US)

(73) Assignee: Illinois Tool Works Inc., Glenview, IL (US)

( * ) Notice: Subject to any disclaimer, the term of this patent is extended or adjusted under 35 U.S.C. 154(b) by 92 days.

(21) Appl. No.: 10/847,179

(22) Filed: May 17, 2004

(65) Prior Publication Data

US 2005/0253101 A1 Nov. 17, 2005

(51) Int. Cl.
*F16K 31/04* (2006.01)

(52) U.S. Cl. .................. 251/122; 251/129.11; 251/360

(58) Field of Classification Search ................ 251/122, 251/121, 129.11, 357, 360
See application file for complete search history.

(56) References Cited

U.S. PATENT DOCUMENTS

| | | | | |
|---|---|---|---|---|
| 2,035,202 | A * | 3/1936 | Smith | 251/122 |
| 3,169,882 | A | 2/1965 | Juvinall et al. | |
| 4,002,777 | A | 1/1977 | Juvinall et al. | |
| 4,479,509 | A * | 10/1984 | Dear et al. | 251/122 |
| 4,763,874 | A * | 8/1988 | Ogawa | 251/122 |
| 4,789,132 | A * | 12/1988 | Fujita et al. | 251/129.11 |
| 4,926,898 | A * | 5/1990 | Sampey | 251/122 |
| 4,948,091 | A * | 8/1990 | Satoh et al. | 251/129.11 |
| 5,970,996 | A * | 10/1999 | Markey et al. | 251/122 |
| 6,371,442 | B1 * | 4/2002 | Hara et al. | 251/129.11 |
| 6,561,480 | B1 * | 5/2003 | Komiya et al. | 251/122 |

OTHER PUBLICATIONS

Ransburg Model REA 3, ITW Ransburg, 320 Phillips Avenue, Toledo, Ohio.
Ransubrg Model REA 4 TW Ransburg, 320 Phillips Avenue, Toledo, Ohio.
REA 70 TW Ransburg, 320 Phillips Avenue, Toledo, Ohio.
REA 90 TW Ransburg, 320 Phillips Avenue, Toledo, Ohio.
REM TW Ransburg, 320 Phillips Avenue, Toledo, Ohio.
M-90 TW Ransburg, 320 Phillips Avenue, Toledo, Ohio.

* cited by examiner

*Primary Examiner*—John Bastianelli
(74) *Attorney, Agent, or Firm*—Lisa M. Soltis; Mark W. Croll; Barnes & Thorn Burg

(57) ABSTRACT

A valve including a valve body, the valve body providing an inlet and an outlet, a valve seat between the inlet and the outlet, a valve member, the valve member and valve seat being relatively movable to control flow through the valve, the valve member engaging the valve seat to prevent flow through the valve and disengaging from the valve seat to permit flow through the valve.

12 Claims, 4 Drawing Sheets

62
60
58
74
74
4
4
56
52
50
81
66

70
56
60
58
74
81
70
74
5
5
74
66
74
70
70
52

NEEDLE VALVE CONSTRUCTION

FIELD OF THE INVENTION

This invention relates to valve construction. It is disclosed in the context of a novel construction of a needle valve, but is believed to be useful in other applications as well.

BACKGROUND OF THE INVENTION

Needle valves of various types are known. There are, for example, the needle valves illustrated and described in U.S. Pat. Nos. 3,169,882 and, 4,002,777. There are also the Ransburg model REA 3, REA 4, REA 70, REA 90, REM and M-90 guns, all available from ITW Ransburg, 320 Phillips Avenue, Toledo, Ohio, 43612-1493. The disclosures of these references are hereby incorporated herein by reference. No representation is intended by this listing that a thorough search of all material prior art has been conducted, or that no better art than that listed is available, or that the listed items are material to patentability. Nor should any such representation be inferred.

DISCLOSURE OF THE INVENTION

According to the invention, a valve includes a valve body providing an inlet and an outlet. The valve further includes a valve seat between the inlet and the outlet, and a valve member. The valve member and valve seat are relatively movable to control flow through the valve. The valve member engages the valve seat to prevent flow through the valve and disengages from the valve seat to permit flow through the valve.

According to one aspect of the invention, the valve member includes an outer surface. Grooves are provided in the outer surface.

According to another aspect of the invention, passageways are provided through the valve member from a region of the valve member more remote from the outlet to a region of the valve member less remote from the outlet.

Illustratively according to the invention, the apparatus includes a prime mover for relatively moving the valve member and the valve seat to change the flow through the valve.

Further illustratively according to the invention, the prime mover comprises a rotary machine for relatively rotating the valve member and valve seat.

Additionally illustratively according to the invention, the valve seat threadedly engages the valve body.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
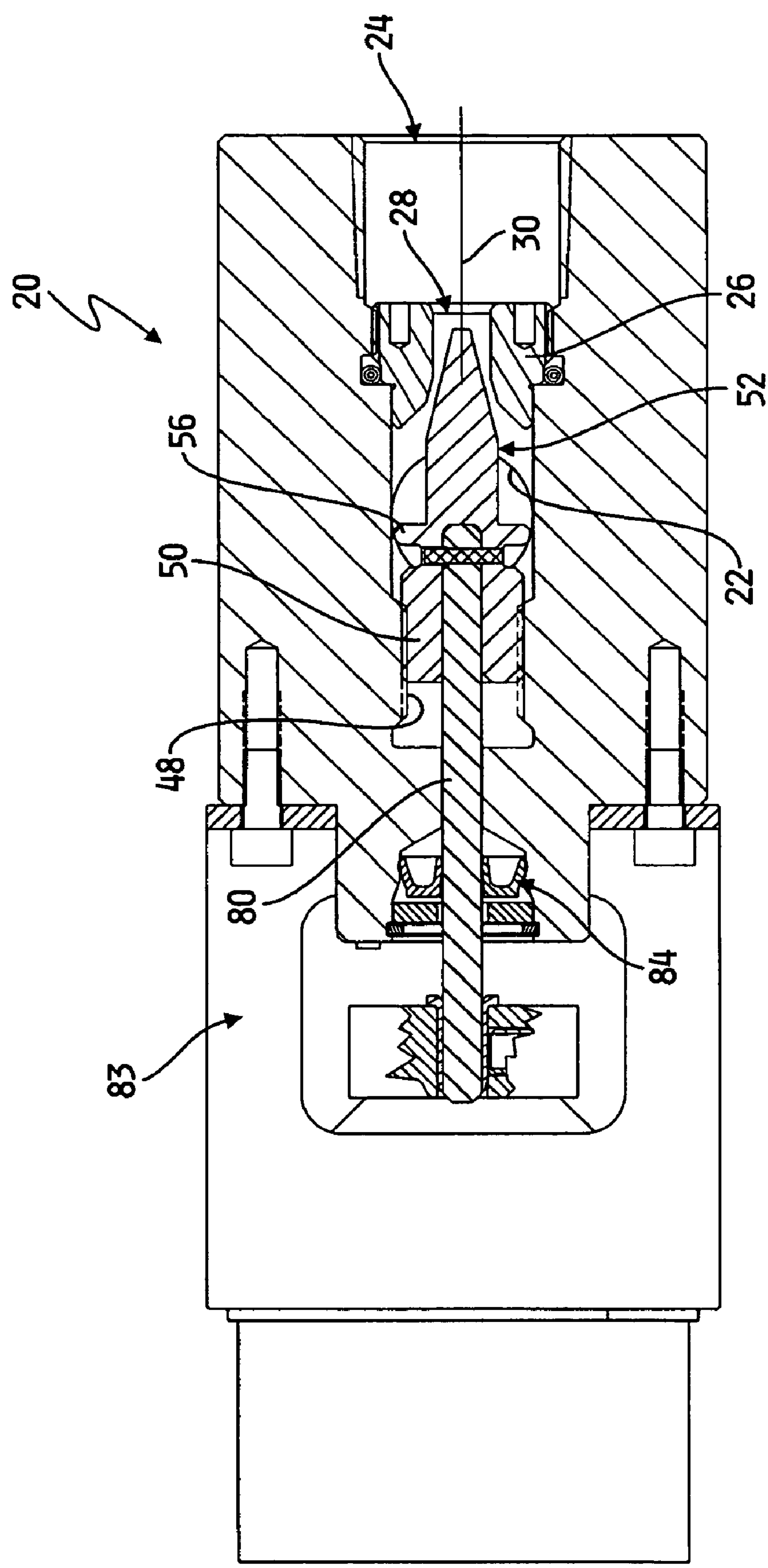
FIG. 1 illustrates a partly sectional side elevational view of a valve including a valve needle and valve seat constructed according to the invention.
Figure 2:
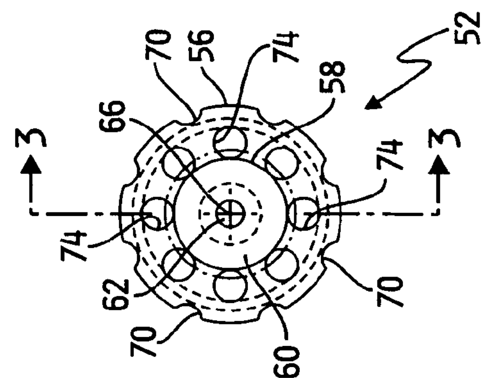
FIG. 2 illustrates an end elevational view of a detail of the valve illustrated in FIG. 1.
Figure 3:
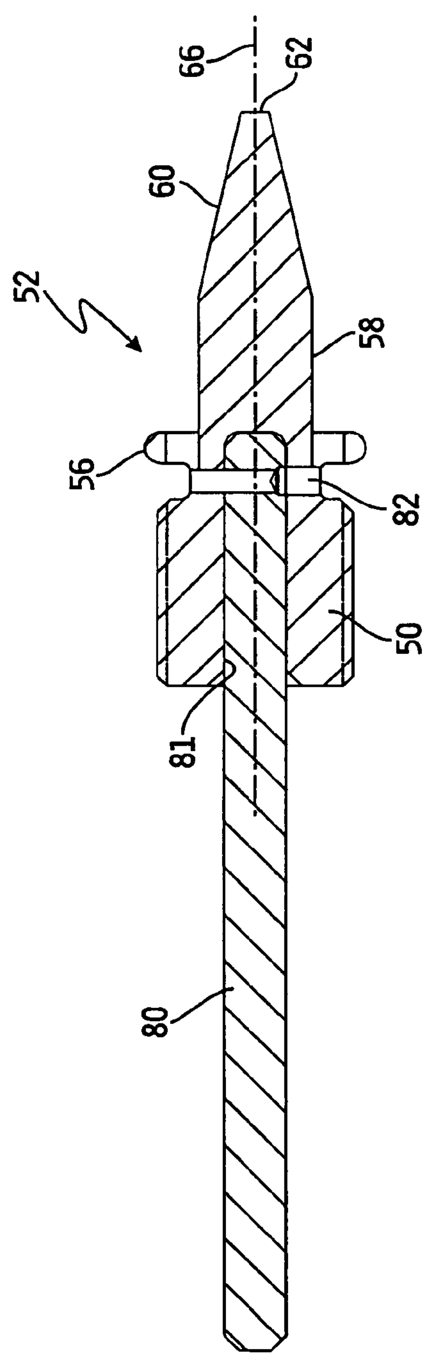
FIG. 3 illustrates a sectional view of the detail illustrated in FIG. 2, taken generally along section lines 3—3 of FIG. 2.
Figure 5:
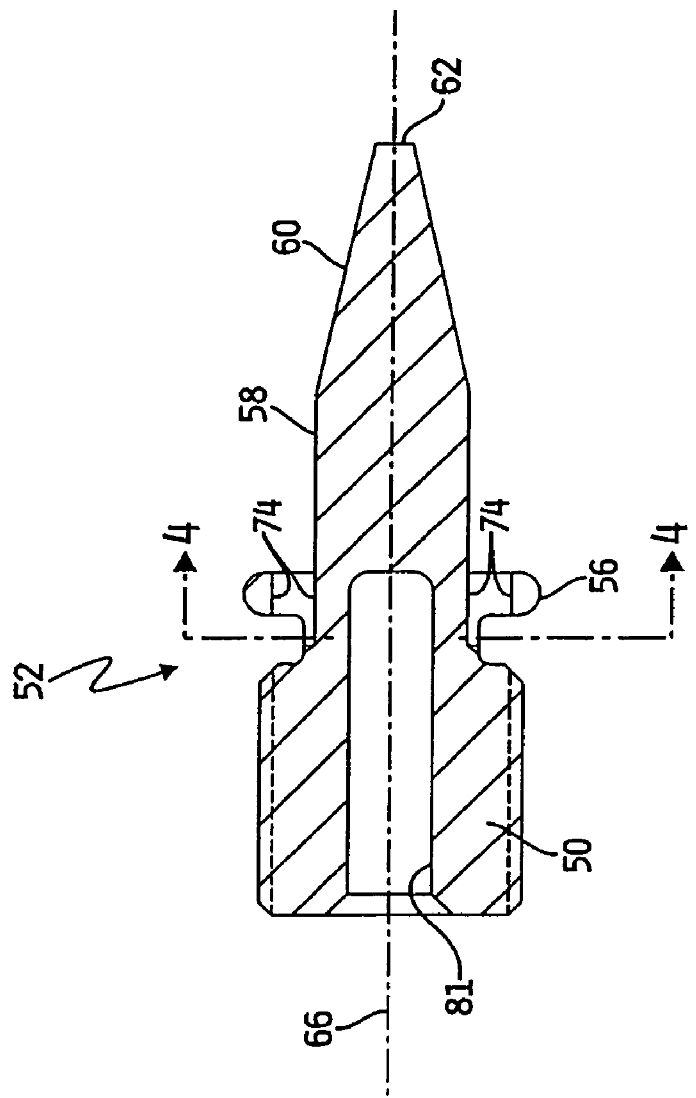
FIG. 5 illustrates a sectional view of the detail illustrated in FIG. 4, taken generally along section lines 5—5 of FIG. 4.
Figure 4:
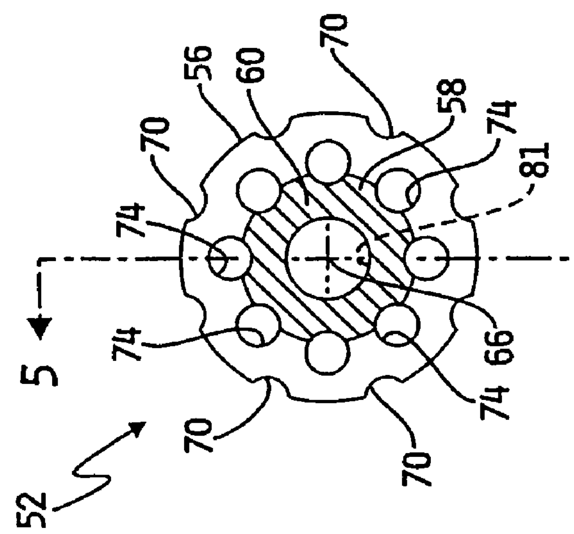
FIG. 4 illustrates an end elevational view of a detail of FIG. 2.

Referring now particularly to FIG. 1, a valve body 20 includes a fluid, for example, air, inlet 22 and an air outlet 24. A valve seat 26 is oriented between inlet 22 and outlet 24. Valve seat 26 illustratively is threaded into valve body 20 by, for example, complementary 9/16-24 UNEF 2A threads on both valve body 20 and valve seat 26. Valve seat 26 illustratively is constructed from 316 stainless steel.

Figure 7:
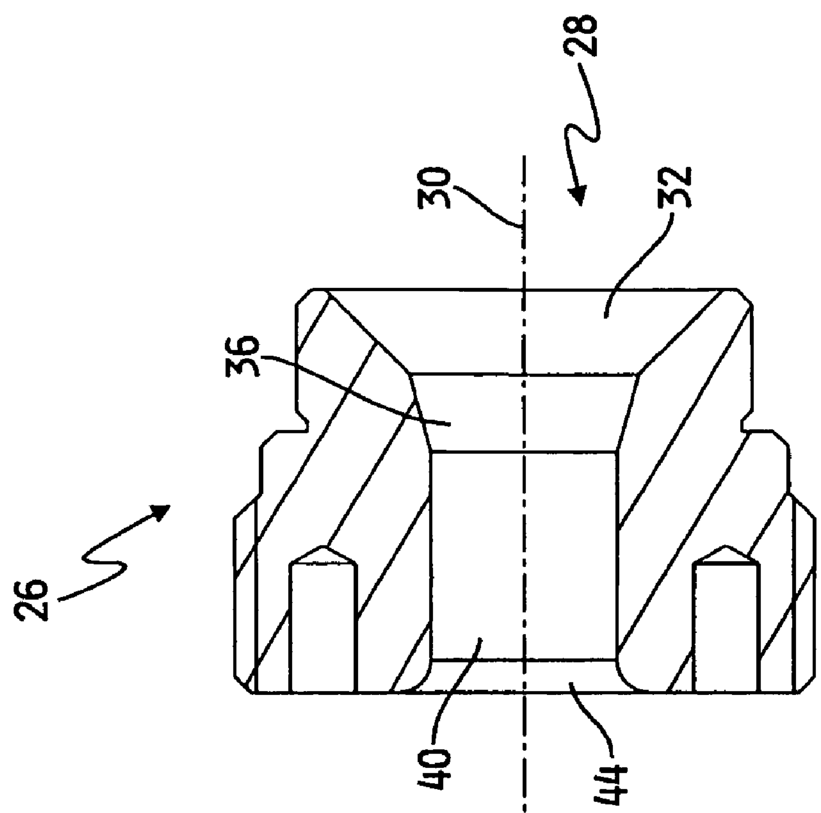
Figure 6:
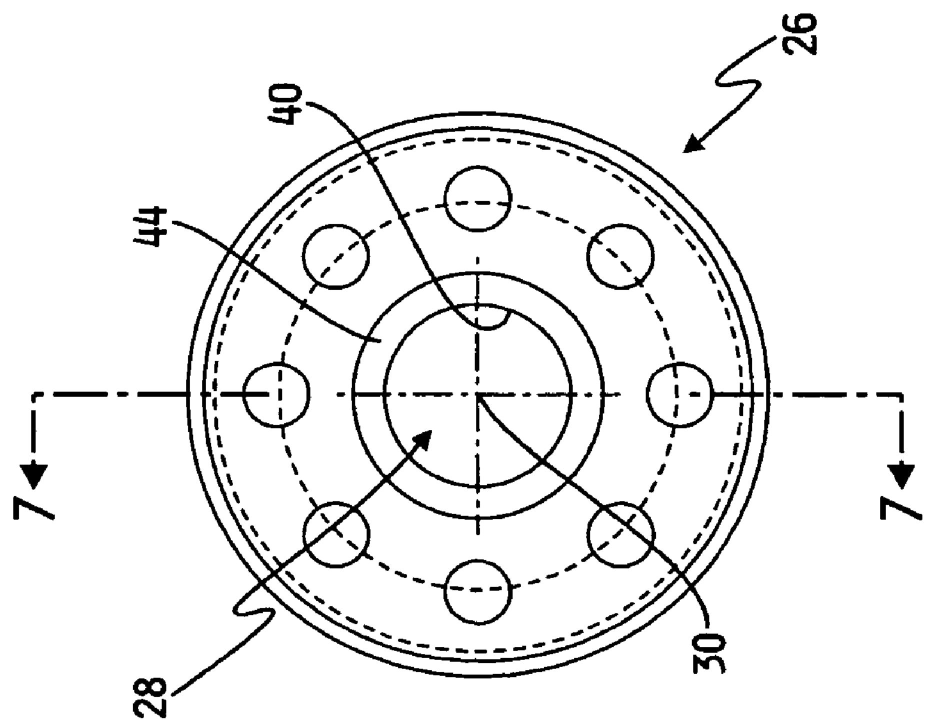
FIG. 6 illustrates an end elevational view of a detail of the valve illustrated in FIG. 1; and, FIG. 7 illustrates a sectional view of the detail illustrated in FIG. 6, taken generally along section lines 7—7 of FIG. 6.

Referring particularly to FIGS. 6–7, valve seat 26 provides a passageway 28 having an axis 30. Passageway 28 includes a first frustoconical seat section 32 having an axial length in the range of about 0.077–about 0.081 inch (about 1.96–about 2.06 mm), the wall of which makes an angle of, for example, about 45° with axis 30. Passageway 28 further includes a second frustoconical seat section 36 having an axial length in the range of about 0.076–about 0.080 inch (about 1.93–about 2.03 mm), the wall of which makes an angle of, for example, about 15° with the axis 30. Passageway 28 also includes a third, generally right circular cylindrical section 40 and an outlet flare 44 having, for example, a circular radius in the range of about 0.03–about 0.033 inch (about 0.762–about 0.838 mm). The overall length of passageway 28 illustratively is about 0.395 inch (about 10 mm).

Valve body 20 includes a threaded passageway 48 receiving a threaded section 50 of a valve needle 52. Illustratively, the threads in passageway 48 and on threaded section 50 of valve needle 52 are 3/8-32 UNEF 2A threads. Forwardly from section 50, needle 52 includes a radially outwardly extending collar 56, a generally right circular cylindrical section 58, a generally frustoconical section 60, and a flat end 62 which is generally perpendicular to an axis 66 of needle 52. The outer surface of section 60 makes an angle of, illustratively, 13° with the axis 66 of needle 52. Grooves 70, which illustratively are substantially half circular in cross section, are equiangularly spaced around collar 56. Illustratively, there are eight such grooves 70 equally spaced around the perimeter of collar 56. Collar 56 further includes passageways 74 which extend through collar 56. Passageways 74 illustratively are equiangularly oriented between adjacent grooves 70. The diameters of the grooves 70 and passageways 74 illustratively are in the range of about 0.060–about 0.064 inch (about The grooves 70 and passageways 74 are believed to reduce turbulence in the flow of fluid through the valve and promote repeatable metering performance.

Valve needle 52 is coupled to an operating rod 80 by, for example, inserting an end of operating rod 80 into a passageway 81 provided therefor in valve needle 52 and pressing a pin 82 into aligned transverse passageways provided in valve needle 52 and operating rod 80. Valve needle 52 is coupled by operating rod 80 to a prime mover 83, such as, for example, a stepper motor. Prime mover 83 turns operating rod 80, and valve needle 52 in turn, toward and away from valve seat 26 to decrease or increase, respectively, the fluid flow cross sectional area between needle 52 and seat 26. Operating rod 80 extends through (a) suitable seal(s) 84 provided in valve body 20. Illustratively, valve needle 52, operating rod 80 and pin 82 are also fabricated from stainless steel. The surfaces of sections 32, 36 and 60 are machined and finished as sealing surfaces.

Fine control of flow volume is achieved using a needle valve constructed according to the present invention. The needle valve includes a valve needle 52 and a needle seat 26 which are relatively movable. The relative positioning of the needle 52 and seat 26 determines a flow area. The valve seat 26 orifice 28 has inlet geometry 32, 36 that is believed to reduce fluid turbulence through the flow area. The needle 26 has geometry that aligns the needle with the center of the orifice 28 defined by the valve seat 26. This geometry promotes repeatable metering performance.

The needle 52 and seat 26 orifice 28 cooperate to deliver the desired volume of fluid. The needle 52 position creates an annular flow area in the valve seat 26 orifice 28. The centering of the needle 52 in the valve seat 26 orifice 28 is aided by the threaded engagement 48, 50 of the needle 52 and valve body 20 and by the collar 56 near the apex of the needle 52 adjacent end 62. The needle 52 is guided 48, 50 through the valve body 20 to align the backside, or upstream side, of the needle 52. The front side, or downstream side, of the needle is centered by the collar 56 in the valve body 20. The collar 56 is directly in the flow path of the fluid that is being presented to the valve seat 26 orifice 28. The collar 56 has both circular cross section and half circular cross section shaped passageways 74, 70, respectively, to control the flow of fluid through the valve. It is believed that this passageway 70, 74 configuration reduces turbulence through the valve, promotes stable and reproducible fluid flow delivery, and permits the passage of foreign particles which might otherwise obstruct the flow of fluid through the valve and affect the repeatability of fluid flow results.

What is claimed is:

1. A valve including a valve body, the valve body providing an inlet and an outlet, a valve seat between the inlet and the outlet, a valve member, the valve member movable relative to the valve seat to control flow through the valve, the valve member engaging the valve seat to prevent flow through the valve and disengaging from the valve seat to permit flow through the valve, the valve member including an outer surface, said outer surface including a portion which engages said valve seat to prevent flow through the valve, and grooves provided on the outer surface permitting flow through the grooves, the grooves not extending through the valve member from said outer surface to an inner surface thereof.

2. The apparatus of claim 1 wherein the valve member further includes passageways therethrough from a region of the valve member more remote from the outlet to a region of the valve member less remote from the outlet.

3. The apparatus of claim 1 further including a prime mover for moving the valve member relative to the valve seat to change the flow through the valve.

4. The apparatus of claim 3 wherein the valve member further includes passageways therethrough from a region of the valve member more remote from the outlet to a region of the valve member less remote from the outlet.

5. The apparatus of claim 3 wherein the prime mover comprises a rotary machine for rotating the valve member relative to the valve seat.

6. The apparatus of claim 5 wherein the valve member further includes passageways therethrough from a region of the valve member more remote from the outlet to a region of the valve member less remote from the outlet.

7. The apparatus of claim 5 wherein the valve seat threadedly engages the valve body.

8. The apparatus of claim 7 wherein the valve member further includes passageways therethrough from a region of the valve member more remote from the outlet to a region of the valve member less remote from the outlet.

9. A valve including a valve body, the valve body providing an inlet and an outlet, a valve seat between the inlet and the outlet, a valve member, the valve member being movable relative to the valve seat to control flow through the valve, the valve member engaging the valve seat to prevent flow through the valve and disengaging from the valve seat to permit flow through the valve, the valve member including an outer surface and passageways through the valve member from a region of the outer surface of the valve member more remote from the outlet to a region of the outer surface of the valve member less remote from the outlet, the passageways permitting flow through the valve member.

10. The apparatus of claim 9 further including a prime mover for moving the valve member relative to the valve seat to change the flow through the valve.

11. The apparatus of claim 10 wherein the prime mover comprises a rotary machine for relatively rotating the valve member and valve seat.

12. The apparatus of claim 11 wherein the valve seat threadedly engages the valve body.

* * * * *